(12) United States Patent
Nate

(10) Patent No.: US 8,724,346 B2
(45) Date of Patent: May 13, 2014

(54) DC/DC CONVERTER, AND POWER SUPPLY AND ELECTRONIC DEVICE USING THE SAME

(75) Inventor: Satoru Nate, Kyoto (JP)

(73) Assignee: Rohm Co., Ltd. (JP)

( * ) Notice: Subject to any disclaimer, the term of this patent is extended or adjusted under 35 U.S.C. 154(b) by 319 days.

(21) Appl. No.: 13/325,123

(22) Filed: Dec. 14, 2011

(65) Prior Publication Data

US 2012/0147631 A1   Jun. 14, 2012

(30) Foreign Application Priority Data

Dec. 14, 2010   (JP) ................................. 2010-278084

(51) Int. Cl.
   *H02M 3/335*   (2006.01)
(52) U.S. Cl.
   USPC ..................................... 363/21.01; 363/21.07
(58) Field of Classification Search
   USPC ............ 363/21.01–21.09, 21.1, 21.11–21.15, 363/21.18
   See application file for complete search history.

(56) References Cited

U.S. PATENT DOCUMENTS

| | | | | |
|---|---|---|---|---|
| 4,450,514 A * | 5/1984 | Peruth | ............................. | 363/37 |
| 5,383,106 A * | 1/1995 | Yoshida et al. | ................. | 363/15 |
| 7,158,392 B2 * | 1/2007 | Hosokawa et al. | ........ | 363/21.06 |
| 8,125,799 B2 * | 2/2012 | Zhu et al. | .................... | 363/21.14 |
| 2007/0159143 A1 * | 7/2007 | Yang | .............................. | 323/247 |
| 2010/0135048 A1 * | 6/2010 | Nagai et al. | ................. | 363/21.01 |
| 2010/0265231 A1 * | 10/2010 | Jang | ............................... | 345/211 |
| 2011/0273912 A1 * | 11/2011 | Kim et al. | .................. | 363/21.09 |
| 2012/0195075 A1 * | 8/2012 | Nate | .......................... | 363/21.01 |

FOREIGN PATENT DOCUMENTS

| | | |
|---|---|---|
| JP | 2-211055 A | 8/1990 |
| JP | 9-98571 A | 4/1997 |

* cited by examiner

*Primary Examiner* — Timothy J Dole
*Assistant Examiner* — Yusef Ahmed
(74) *Attorney, Agent, or Firm* — Cantor Colburn LLP

(57) ABSTRACT

A DC/DC converter includes a transformer including primary and secondary coils and an auxiliary coil disposed in a primary coil side; a first output capacitor including a first end having a fixed electric potential and a second end; a first diode disposed in a direction where a cathode of the first diode faces the first output capacitor, between the second end of the first output capacitor and one end of the secondary coil; a switching transistor disposed on a path of the primary coil; a second output capacitor including a first end having a fixed electric potential and a second end; a second diode and a switch disposed between the second end of the second output capacitor and the first port of the auxiliary coil; and a control circuit receiving voltage generated in the second output capacitor through a power supply port and controlling turn-on/off of the switching transistor.

12 Claims, 6 Drawing Sheets

US 8,724,346 B2

DC/DC CONVERTER, AND POWER SUPPLY AND ELECTRONIC DEVICE USING THE SAME

CROSS-REFERENCE TO RELATED APPLICATION

This application is based upon and claims the benefit of priority from Japan Patent Application No. 2010-278084, filed on Dec. 14, 2010, the entire contents of which are incorporated herein by reference.

TECHNICAL FIELD

The present disclosure relates to a DC/DC converter.

BACKGROUND

Various home appliances such as televisions or refrigerators, or electronic devices such as laptop computers, portable phone terminals or Personal Digital Assistants (PDAs) operate with power that is received from the outside, and a built-in battery thereof may be charged with power supplied from an external power source. Furthermore, a power supply that converts a commercial Alternating Current (AC) voltage into a Direct Current (DC) voltage is built in home appliances or electronic devices (hereinafter generically referred to as electronic devices), or the power supply is built in an external power adaptor (AC adaptor) for the electronic devices.

The power supply includes a rectifier circuit (diode bridge circuit) that rectifies an AC voltage, and an insulating DC/DC converter that drops the rectified voltage and supplies the dropped voltage to a load.

FIG. 1 is a diagram illustrating a configuration of a DC/DC converter that has been studied by the inventor. A detailed configuration of the DC/DC converter 100r should not be regarded as a general technology that is well known to those skilled in the art.

An input port P1 of the DC/DC converter 100r receives a DC input voltage $V_{IN}$ from a rectifier circuit (not shown) that is prepared in a stage previous thereto. The DC/DC converter 100r drops the input voltage $V_{IN}$, and supplies the dropped voltage to a load that is connected to an output port P2 of the DC/DC converter 100r.

The DC/DC converter 100r mainly includes a switching transistor M1, a transformer T1, a first diode D1, a first output capacitor Co1, a control circuit 10r, and a feedback circuit 20r. In the DC/DC converter 100r, a primary side region and a secondary side region of the transformer T1 are necessarily required to be electrically insulated from each other. The feedback circuit 20r includes resistors R1 and R2 that divide the output voltage $V_{OUT}$, a shunt regulator 22, and a photo coupler 24.

The shunt regulator 22 is an error amplifier that amplifies an error between the divided output voltage $V_{OUT}'$ and a reference voltage $V_{REF}$ based on a target value of the output voltage $V_{OUT}$. The photo coupler 24 feeds back a feedback signal, based on an error between the output voltage $V_{OUT}$ and the target voltage, to the control circuit 10r. The control circuit 10r controls an on/off duty ratio of the switching transistor M1 by using pulse modulation such that the output voltage $V_{OUT}$ matches with the target voltage.

The control circuit 10r may operate with a supply voltage $V_{CC}$ of about 10 V, and thus, when the control circuit 10r is driven with the input voltage $V_{IN}$ (about 140 V), efficiency is degraded. The voltage $V_{OUT}$ dropped by the DC/DC converter 100r is generated in the secondary side of the transformer T1, and thus cannot be supplied to the control circuit 10r that is prepared in the primary side.

Therefore, an auxiliary coil L3 is prepared in the primary side of the transformer T1. The auxiliary coil L3, a second diode D2, and a second output capacitor Co2 act as an auxiliary DC/DC converter for generating the source voltage $V_{CC}$ for the control circuit 10r. In the DC/DC converter 100r, the source voltage $V_{CC}$ is proportional to the output voltage $V_{OUT}$, and a proportional coefficient is defined as a turn ratio of the secondary coil L2 of the transformer T1 and the auxiliary coil L3:

$$V_{CC} = V_{OUT} \times N_D / N_S$$

where $N_S$ is the number of turns of the secondary coil L2, and $N_D$ is the number of turns of the auxiliary coil L3.

SUMMARY

The inventors have studied the DC/DC converter 100r, and thus have found the following problems. For example, the DC/DC converter 100r is considered as being mounted in a television. Currently, when a television is in a standby state, consumption power is required to be limited to less than 0.3 W. In the future, for example, lower consumption power is required to be limited to less than 0.1 W.

In order to decrease the total consumption power of an electronic device in a standby state, a consumption power of a microcomputer (which is a load) or other signal processing circuit is required to be reduced. As one approach for this end, the output voltage $V_{OUT}$ of the DC/DC converter 100r may be further reduced in a standby state than a normal state.

For example, the output voltage $V_{OUT}$ of the DC/DC converter 100r may be 12 V in a normal state, and reduced to 6 V in a standby state. When a turn ratio of the secondary coil L2 and auxiliary coil L3 is 1:1, the source voltage $V_{CC}$ that is 12 V in the normal state is reduced to 6 V. Therefore, since the source voltage $V_{CC}$ is far lower than "$V_{CC}$=10 V," which is an operation assurance voltage of the control circuit 10r, the DC/DC converter 100 does not properly operate.

Alternatively, even though the control circuit 10r is capable of operation, the efficiency of the DC/DC converter 100r is degraded. This is because an amplitude of a gate signal of the switching transistor M1 is dependent on the source voltage $V_{CC}$, and thus, if the source voltage $V_{CC}$ decreases, the amplitude of the gate signal of the switching transistor M1 is reduced, thereby increasing an on resistance of the switching transistor M1.

The present disclosure provides some embodiments of an insulating DC/DC converter that is capable of operation even when an output voltage thereof decreases, or can maintain high efficiency.

According to one embodiment of the present disclosure, there is provided an insulating DC/DC converter, including: a transformer including a primary coil, a secondary coil, and an auxiliary coil which is disposed in a primary coil side, the auxiliary coil including: a first port configured to generate a first voltage which is obtained by multiplying a voltage generated in the secondary coil and a first coefficient; and a second port configured to generate a second voltage which is obtained by multiplying the voltage generated in the secondary coil and a second coefficient greater than the first coefficient; a first output capacitor including a first end and a second end, the first end of the first output capacitor having a fixed electric potential, and the second end being connected to an output port of the DC/DC converter; a first diode disposed in a direction where a cathode of the first diode faces the first output capacitor, between the second end of the first output capacitor and one end of the secondary coil; a switching transistor disposed on a path of the primary coil; a second output capacitor including a first end and a second end, the first end of the second output capacitor having a fixed electric potential; a second rectification element disposed in a direction where a cathode of the second rectification element faces the second output capacitor, between the second end of the second output capacitor and the first port of the auxiliary coil; a third rectification element disposed in a direction where a cathode of the third rectification element faces the second output capacitor, between the second end of the second output capacitor and the second port of the auxiliary coil; a selection circuit configured to select a first path including the second rectification element in a first mode where an output voltage of the output port has a first level, and select a second path including the third rectification element in a second mode where the output voltage has a second level lower than the first level; and a control circuit configured to receive a voltage which is generated in the second output capacitor through a power supply port and control turn-on or turn-off of the switching transistor.

With this configuration, an amplitude generated in the second port of the auxiliary coil is greater than an amplitude generated in the first port of the auxiliary coil. Thus, a voltage generated in the second output capacitor when the second path is effective becomes greater than a voltage generated in the second output capacitor when the first path is effective. In a standard mode, the first path is effective, but in a case where the level of the output voltage is lowered, the second path becomes effective, and thus an appropriate level of the power supply voltage can be supplied to a power supply terminal of the control circuit even when the output voltage is lowered. Further, the power supply voltage is not lowered for the control circuit, and thus an on resistance of the switching transistor is not decreased, thereby preventing a deterioration of the efficiency of the DC/DC converter.

In another embodiment of the present disclosure, the auxiliary coil includes one coil having a tap which is arranged in the middle of a winding thereof, the tap being the first port, and one end of the auxiliary coil being the second port. With this configuration, the circuit area and manufacturing cost of the device can be suppressed.

In yet another embodiment of the present disclosure, the auxiliary coil includes two coils, one end of a coil of one side being the first port, and one end of a coil of the other side being the second port.

In still another embodiment of the present disclosure, the DC/DC converter is switched between the first mode and the second mode according to a control signal generated based on a load of the DC/DC converter, the DC/DC converter further includes a photo coupler configured to transfer the control signal from a secondary side of the transformer to a primary side of the transformer, and the selection circuit is controlled on the basis of the control signal. With this configuration, switching between the first mode and the second mode is controlled based on the load, thereby setting the selection circuit in an appropriate state according to the respective mode.

In still another embodiment of the present disclosure, the DC/DC converter further includes: an error amplifier configured to generate an error signal based on an error between the output voltage and a predetermined reference voltage; and a photo coupler configured to receive the error signal from the error amplifier, and transfer a feedback signal based on the error signal from the secondary side of the transformer to the primary side of the transformer, and the control circuit controls turn-on or turn-off of the switching transistor on the basis of the feedback signal.

In still another embodiment of the present disclosure, the DC/DC converter further includes a voltage dividing circuit configured to divide the output voltage at a changeable voltage division ratio, and output the divided voltage to the error amplifier, and the voltage division ratio of the voltage dividing circuit is changed according to whether the DC/DC converter is in the first mode or the second mode. With this configuration, the output voltage may be switched based on the voltage division ratio of the voltage dividing circuit.

In still another embodiment of the present disclosure, the voltage division ratio of the voltage dividing circuit is changed according to a control signal generated based on a load of the DC/DC converter, and the DC/DC converter further includes a photo coupler configured to transfer the control signal from a secondary side of the transformer to a primary side of the transformer, and the selection circuit is controlled on the basis of the control signal. With this configuration, the switching between the first mode and the second mode is controlled based on the load, thereby setting the selection circuit in an appropriate state according to the respective mode.

In still another embodiment of the present disclosure, the selection circuit includes a first switch disposed in series with the third rectification element, between the second end of the second output capacitor and the second port of the auxiliary coil.

In still another embodiment of the present disclosure, the first switch includes a PNP type bipolar transistor, a collector of the PNP type bipolar transistor being connected to the second output capacitor.

In still another embodiment of the present disclosure, the selection circuit further includes a second switch disposed in series with the second rectification element, between the second end of the second output capacitor and the first port of the auxiliary coil.

In still another embodiment of the present disclosure, there is provided an electronic device, including: a microcomputer; and a DC/DC converter configured to supply an output voltage thereof to the microcomputer. In a normal state of the electronic device, the DC/DC converter generates an output voltage having a first level, and in a standby state of the electronic device, the DC/DC converter generates an output voltage having a second level lower than the first level.

With this configuration, power consumption is reduced in the standby state.

DETAILED DESCRIPTION

Figure 1:
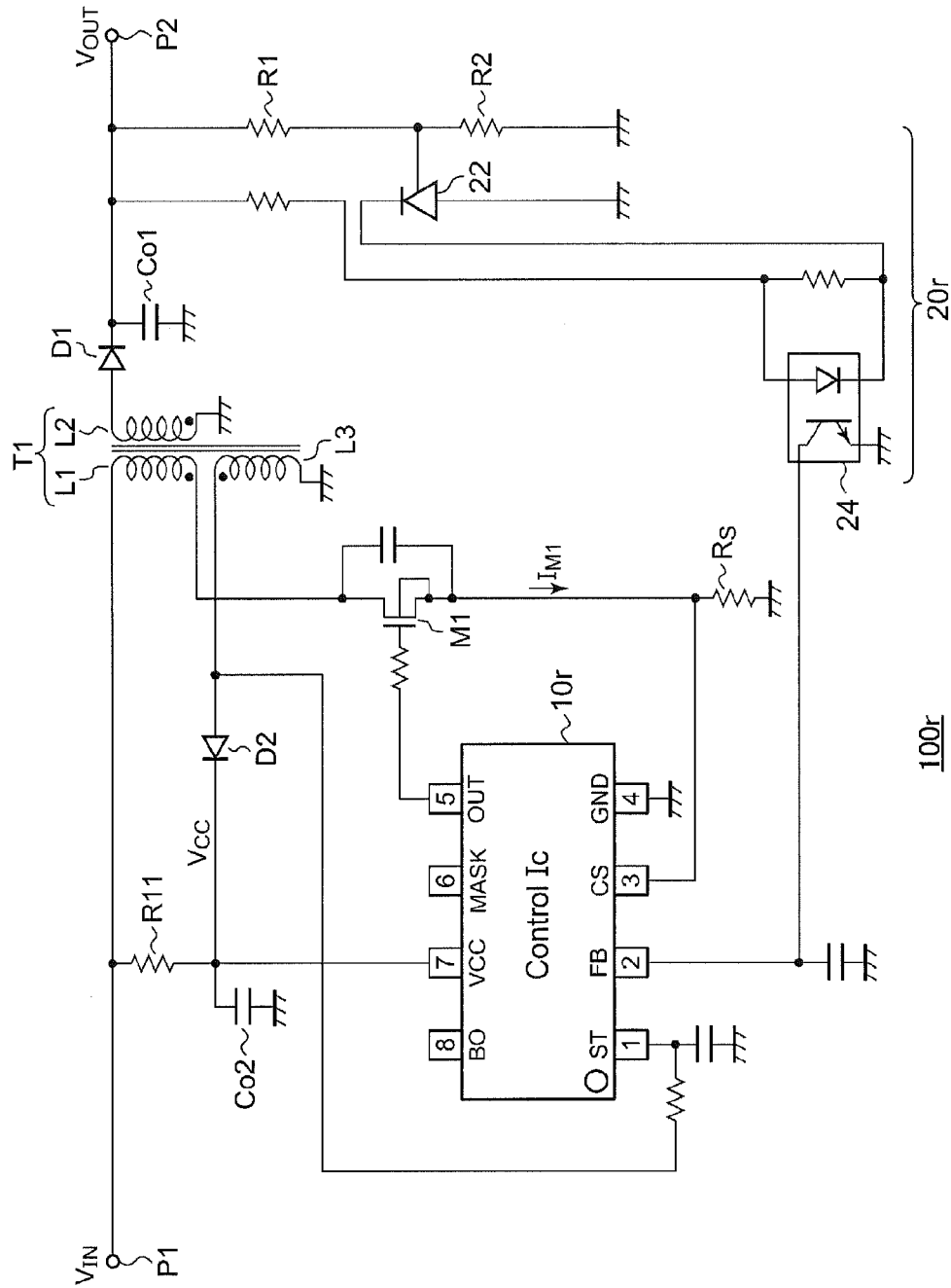
FIG. 1 is a diagram illustrating a configuration of a DC/DC converter that has been studied by the inventor.

Hereinafter, embodiments of the present disclosure will be described with reference to the drawings. The same or equal elements, members, and processing illustrated in each of the drawings are indicated by the same reference numerals, and a repetitive description is not provided. Moreover, the embodiments do not limit the present disclosure but exemplify the present disclosure, and all features described in aspects or combination thereof may or may not be essential to the present disclosure.

In the specification, "a member A being connected to a member B" includes a case where the member A and the member B are physically and directly connected to each other, or a case where the member A and the member B are indirectly connected to each other through another member that does not affect an electrical connection.

Likewise, "a member C being prepared between the member A and the member B" includes a case where the member A and the member C are directly connected to each other or the member B and the member C are directly connected to each other, and a case where the member A and the member C are indirectly connected to each other through another member that does not affect an electrical connection or the member B and the member C are indirectly connected to each other through the other member.

Figure 2:
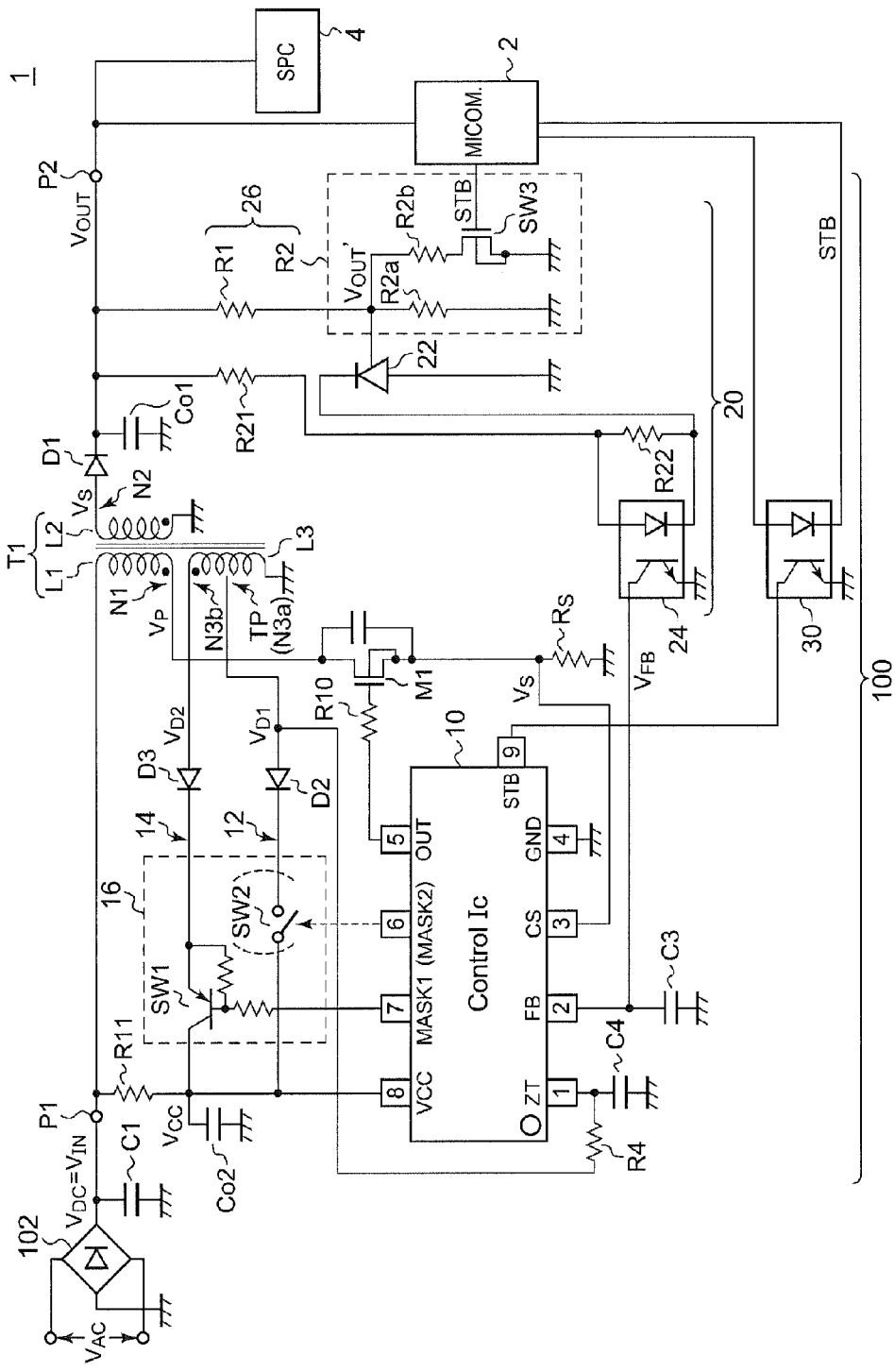
FIG. 2 is a circuit diagram illustrating a configuration of an electronic device according to an embodiment.

FIG. 2 is a circuit diagram illustrating a configuration of an electronic device according to an embodiment.

An electronic device 1, for example, is a computer or a home appliance such as a television, a refrigerator, or an air conditioner. The electronic device 1 includes a microcomputer (MICOM.) 2, a signal processing circuit (SPC) 4, a DC/DC converter 100, and a rectifier circuit 102. The electronic device 1 is divided into a primary side and a secondary side, which are electrically insulated from each other. The rectifier circuit 102 and half of the DC/DC converter 100 are disposed in the primary side. The other half of the electronic device 1, the microcomputer 2, and the signal processing circuit 4 are disposed in the secondary side.

The rectifier circuit 102, for example, is a diode rectifier circuit. The rectifier circuit 102 receives an AC voltage $V_{AC}$ such as a commercial AC voltage to full-wave rectify the AC voltage $V_{AC}$, and smoothes the rectified AC voltage to generate a DC voltage $V_{DC}(=V_{IN})$ with a capacitor C1. When $V_{AC}=100$ V, $V_{DC}=144$ V.

An input port P1 of the DC/DC converter 100 receives a DC input voltage $V_{IN}$. The DC/DC converter 100 drops the DC input voltage $V_{IN}$ and outputs the dropped voltage through an output port P2 thereof. Although not shown, a Power Factor Correction (PFC) circuit may be prepared between the DC/DC converter 100 and the rectifier circuit 102. The output voltage $V_{OUT}$ from the output port P2 is outputted to the microcomputer 2 and the signal processing circuit 4. The microcomputer 2 integratedly controls the entirety of the electronic device 1. The signal processing circuit 4 is a block for performing specific signal processing; for example, an interface circuit for communicating with an external device, a video processing circuit, or an audio processing circuit is exemplified as the signal processing circuit 4. In the actual electronic device 1, a plurality of signal processing circuits 4 may be prepared according to a function of the electronic device 1. An operation assurance voltage of the microcomputer 2, for example, is 6 V, and an operation assurance voltage of the signal processing circuit 4 is 12 V higher than that of the microcomputer 2.

The electronic device 1 can be switched from a normal state (called a normal mode) to a standby state (called a standby mode) or from the standby state to the normal state. In the normal mode, the microcomputer 2 and the signal processing circuit 4 are operated. Therefore, the DC/DC converter 100 drops the input voltage $V_{IN}$ to 12 V (first level), and outputs the dropped voltage to the microcomputer 2 and the signal processing circuit 4. In the standby mode, the signal processing circuit 4 is in a non-operation state, and only the microcomputer 2 is operated. Accordingly, since the total consumption power of the electronic device 1 decreases, the output voltage $V_{OUT}$ of the DC/DC converter 100 is dropped to 6 V (second level) lower than the first level (12 V).

In the present embodiment, switching between the normal mode and the standby mode is performed by the microcomputer 2. Also, the microcomputer 2 generates a control signal STB (called an STB signal) indicating a mode. The control signal STB is asserted (high level) in the standby mode, and negated (low level) in the normal mode.

The above-described configuration is the entire configuration of the electronic device 1. Continuously, the DC/DC converter 100 appropriately usable for the electronic device 1 will be described below.

The DC/DC converter 100 mainly includes a transformer T1, a first diode D1, a second diode D2, a third diode D3, a first output capacitor Co1, a second output capacitor Co2, a switching transistor M1, a control circuit 10, a feedback circuit 20, a photo coupler 30, and a selection circuit 16.

The transformer T1 has a primary coil L1, a secondary coil L2, and an auxiliary coil L3 that is prepared in the primary coil side. $N_P$ is the number of turns of the primary coil L1, and $N_S$ is the number of turns of the secondary coil L2. Also, $N_{D2}$ is the number of turns of the auxiliary coil L3. A tap TP is prepared in the auxiliary coil L3, and $N_{D1}$ is the number of turns of a lower-level side of the auxiliary coil L3 arranged below the tap TP.

A first voltage $V_{D1}$, which is obtained by multiplying a voltage $V_S$ (which is generated in the secondary coil L2) by a first coefficient (turn ratio "$N_{D1}/N_S$"), is generated in the tap TP (called a first port N3a) of the auxiliary coil L3. A second voltage $V_{D2}$, which is obtained by multiplying the voltage $V_S$ (which is generated in the secondary coil L2) by a second coefficient ($N_{D2}/N_S$) greater than the first coefficient, is generated in one end (second port N3b) of the auxiliary coil L3. In the present embodiment, $N_S:N_{D1}:N_{D2}=1:1:2$.

The switching transistor M1, the primary coil L1, the secondary coil L2, the first diode D1, and the first output capacitor Co1 configure a first converter (main converter).

The first output capacitor Co1 includes a first end and a second end. An electric potential of the first end of the first output capacitor Co1 is grounded and fixed. The secondary coil L2 includes a first end and a second end. The first diode D1 is arranged between the second end of the first output capacitor Co1 and the first end of the secondary coil L2. A cathode of the first diode D1 is connected to the second end of the first output capacitor Co1. The second end of the secondary coil L2 is grounded, and an electric potential thereof is fixed.

The switching transistor M1 is prepared on a path of the primary coil L1. A gate of the switching transistor M1 receives a switching signal OUT from the control circuit 10 through a resistor R10.

The switching transistor M1, the primary coil L1, the auxiliary coil L3, the second diode D2, the third diode D3, and the second output capacitor Co2 configure a second converter (auxiliary converter).

The second output capacitor Co2 includes a first end and a second end. An electric potential of the first end of the second output capacitor Co2 is fixed. The second diode (second rectification element) D2 is prepared between the second end of the second output capacitor Co2 and the tap TP of the auxiliary coil L3, namely, the first port N3a. The auxiliary coil L3 includes a first end and a second end. The first end of the auxiliary coil L3 is grounded, and an electric potential thereof is fixed. The second diode D2 is disposed in a direction where a cathode thereof is connected to the second output capacitor Co2.

The third diode D3 (third rectification element) is prepared between the second end of the second output capacitor Co2 and the second port N3b of the auxiliary coil L3. The third diode D3 is disposed in a direction where a cathode thereof is connected to the second output capacitor Co2.

In the normal mode where the output voltage $V_{OUT}$ has the first level (12 V), the selection circuit 16 selects a first path 12 including the second diode D2, and thus, the first path 12 becomes effective. In the standby mode where the output voltage $V_{OUT}$ has the second level (6 V) lower than the first level (12 V), the selection circuit 16 selects a second path 14 including the third diode D3, and thus, the second path 14 becomes effective. Specifically, the selection circuit 16 includes a first switch SW1 that is prepared in series with the third diode D3, between the second output capacitor Co2 and the second port N3b of the auxiliary coil L3. When the first switch SW1 is turned off, the first path 12 becomes effective. When the first switch SW1 is turned on, the second diode D2 and the third diode D3 act as an OR circuit, and a relationship of "$V_{D2} > V_{D1}$" is established between a voltage $V_{D2}$ of the second port N3b and a voltage $V_{D1}$ of the first port N3a (tap TP), whereby the second path 14 becomes effective.

For example, the first switch SW1 may be a PNP type bipolar transistor and a collector thereof is connected to the second output capacitor Co2. A base and an emitter of the PNP type bipolar transistor are connected to each other through a resistor, and the base receives a mask signal MASK1 from the control circuit 10. When a MASK1 port is in a high impedance state, the first switch SW1 is turned off, but when the MASK1 port has a low level, the first switch SW1 is turned on. The first switch SW1 may also be configured with a P channel MOSFET or another element.

In the normal mode where the first path 12 is effective, a source voltage $V_{CC1}$ proportional to a turn ratio ($N_{D1}/N_S$) is generated in the second output capacitor Co2:

$$V_{CC1} = N_{D1}/N_S \times V_{OUT} \qquad (1)$$

In the standby mode where the second path 14 is effective, a voltage $V_{CC2}$ of the second output capacitor Co2 is expressed as Equation (2):

$$V_{CC2} = N_{D2}/N_S \times V_{OUT} \qquad (2)$$

A source port $V_{CC}$ (number eight pin) of the control circuit 10 receives the second voltage $V_{CC}$ that is generated in the second output capacitor Co2. Also, during a period before the second converter operates normally, the DC voltage $V_{DC}$ is supplied to the source port $V_{CC}$ of the control circuit 10 through a resistor R11.

The control circuit 10 adjusts a duty ratio of the switching signal OUT in order for the level of the output voltage $V_{OUT}$ to approximate a target value by using Pulse Width Modulation (PWM), Pulse Frequency Modulation (PFM) or the like, thereby controlling the switching transistor M1. A method of generating the switching signal OUT is not particularly limited.

A feedback signal $V_{FB}$ corresponding to the output voltage $V_{OUT}$ is inputted to a feedback port (number two pin) of the control circuit 10 via the feedback circuit 20 including a photo coupler. A capacitor C3 is prepared for a phase compensation.

For example, the feedback circuit 20 includes a shunt regulator 22, a photo coupler 24, and a voltage dividing circuit 26. The voltage dividing circuit 26 divides the output voltage $V_{OUT}$ of the DC/DC converter 100 at a voltage division ratio K. The shunt regulator 22 amplifies an error between the divided output voltage $V_{OUT}'(=V_{OUT} \times K)$ and a predetermined reference voltage $V_{REF}$, and outputs a current $I_{FB}$ based on the error. In a path of an output current $I_{FB}$ of the shunt regulator 22, a light emitting diode is prepared at an input side of the photo coupler 24. The photo coupler 24 outputs the feedback signal $V_{FB}$, based on the error between the output voltage $V_{OUT}'$ and the reference voltage $V_{REF}$, to an FB port of the control circuit 10. Resistors R21 and R22 are prepared for appropriately biasing the light emitting diode of the photo coupler 24.

The control circuit 10 receives the feedback signal $V_{FB}$ and generates the switching signal OUT of which a duty ratio is adjusted in order for the divided output voltage $V_{OUT}'$ to match with the reference voltage $V_{REF}$, thereby driving the switching transistor M1.

When a voltage division ratio of the voltage dividing circuit 26 is K, the output voltage $V_{OUT}$ is stabilized to meet Equation (3) below by feedback:

$$V_{OUT} = V_{REF}/K \qquad (3)$$

In the present embodiment, to switch between the normal mode and the standby mode, the voltage division ratio K of the voltage dividing circuit 26 is controlled by the control signal STB from the microcomputer 2 to have one of two values.

The voltage dividing circuit 26 includes a first resistor R1 and a second resistor R2 that are connected serially between an output port P2 and a ground port, and specifically, the second resistor R2 is a variable resistor. The second resistor R2 includes a resistor R2a, and a resistor R2b and a switch SW3 that are arranged in parallel to the resistor R2a. In the normal mode, since the control signal STB has a low level, the switch SW3 is turned off, and a voltage division ratio $K_1$ is "$K_1 = R1/R2 = R1/R2a$". In the standby mode, the switch SW3 is turned on, and a voltage division ratio $K_2$ is "$K_2 = R1/R2 = R2/(R2a//R2b)$". Herein, "//" indicates a complex impedance of parallel resistors.

Since the output voltage $V_{OUT}$ is expressed as Equation (3), the output voltage $V_{OUT}$ may be changed by changing the voltage division ratio K. For example, when $V_{REF} = 2.5$ V, in order to satisfy "$K_1 = 12/2.5$ and $K_2 = 6/2.5$", respective resistance values of the resistors R1, R2a and R2b may be determined.

The control signal STB, which is generated by the microcomputer 2 according to a mode of the electronic device 1, is inputted to the photo coupler 30. The photo coupler 30 transfers the control signal STB, generated in the secondary side, to the primary side. The control signal STB is inputted to a standby port STB of the control circuit 10. The control circuit 10 changes a voltage of the MASK1 port according to the control signal STB, and switches an on/off state of the first switch SW1.

A detailed configuration example of the control circuit 10 will be described below. Furthermore, in the present disclosure, the configuration of the control circuit 10 is not particularly limited.

For example, the control circuit 10 generates the switching signal OUT according to the output voltage $V_{OUT}$ generated in the first output capacitor Co1, a current $I_{M1}$ flowing in the switching transistor M1 (primary coil L1), and the first voltage $V_{D1}$ generated in the tap TP of the auxiliary coil L3.

A detection resistor $R_S$ is prepared for detecting the current $I_{M1}$ that flows in the switching transistor M1. Voltage drop (detection signal) $V_S$, which occurs in the detection resistor $R_S$, is inputted to a current detection port (CS port: number three pin) of the control circuit 10. Also, the voltage $V_{D1}$ of the tap TP of the auxiliary coil L3 is inputted to a ZT port (number one pin) of the control circuit 10 via a low-pass filter that includes a resistor R4 and a capacitor C4.

Figure 3:
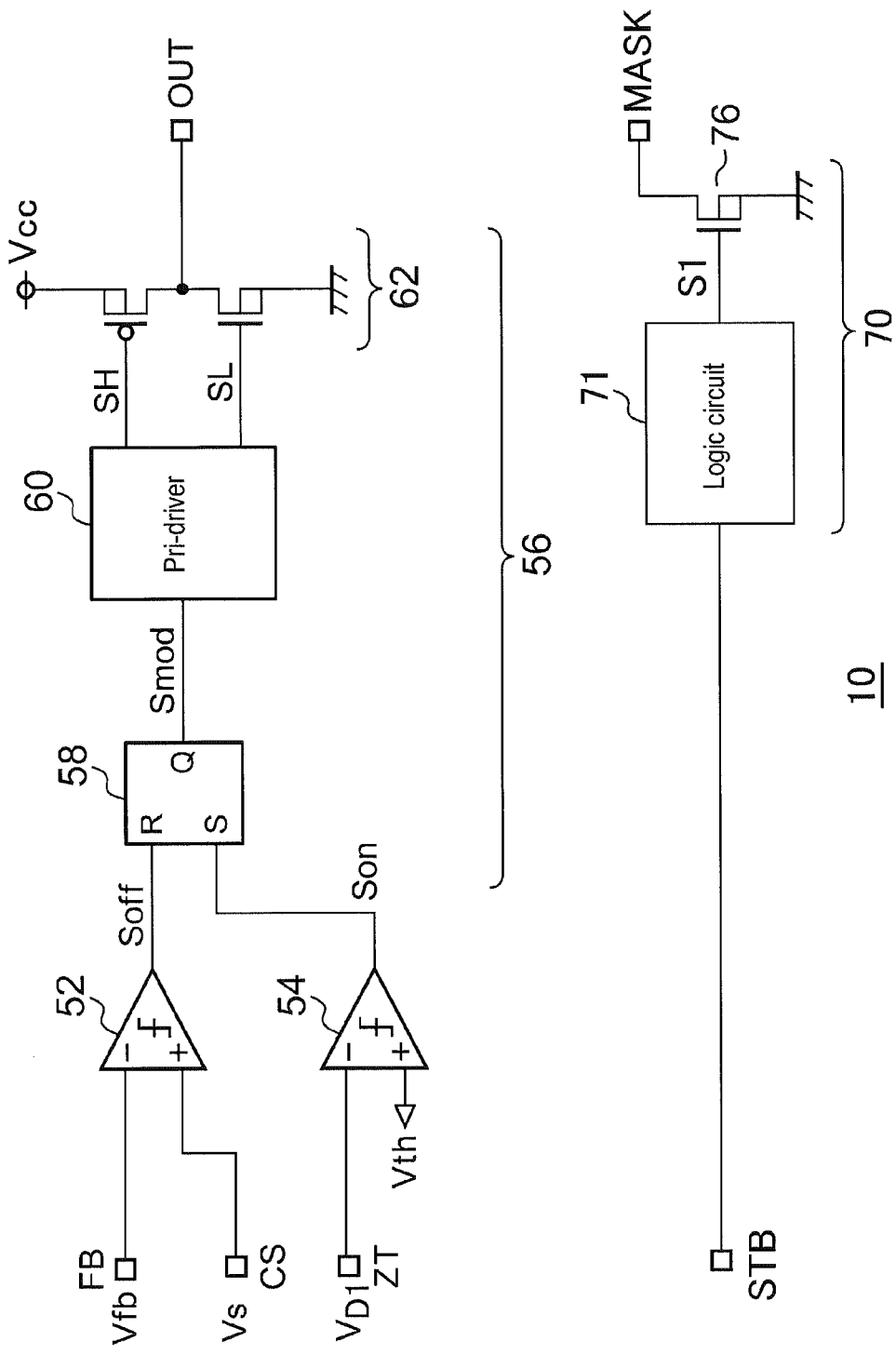
FIG. 3 is a circuit diagram illustrating a configuration example of a control circuit of FIG. 2.

FIG. 3 is a circuit diagram illustrating a configuration example of the control circuit 10 of FIG. 2. The control circuit 10 includes an off signal generation unit 52, an on signal generation unit 54, a driving unit 56, and a switch control unit 70.

The off signal generation unit 52 includes a comparator that compares the detection signal Vs with the feedback signal Vfb, and generates an off signal Soff defining a timing when the switching transistor M1 is turned off. The off signal Soff generated by the off signal generation unit 52 is asserted when the current $I_{M1}$ flowing in the switching transistor M1 reaches a level corresponding to the feedback signal Vfb.

For example, when the output voltage $V_{OUT}'$ becomes lower than the reference voltage $V_{REF}$, the feedback signal Vfb becomes higher, a timing when the off signal Soff is asserted becomes later, an on period Ton of the switching transistor M1 becomes longer, and thus, feedback is provided in a direction where the output voltage $V_{OUT}$ increases. On the contrary, when the output voltage $V_{OUT}'$ becomes higher than the reference voltage $V_{REF}$, the feedback signal Vfb becomes lower, the timing when the off signal Soff is asserted becomes earlier, the on period Ton of the switching transistor M1 becomes shorter, and thus, feedback is provided in a direction where the output voltage $V_{OUT}$ decreases.

The on signal generation unit 54 generates an on signal Son that is asserted after the off signal Soff is asserted. The on signal generation unit 54 of FIG. 3 includes a comparator that compares the electric potential $V_{D1}$ of the tap TP of the auxiliary coil L3 with a predetermined level Vth. The on signal generation unit 54 asserts the on signal Son when the electric potential $V_{D1}$ of the tap TP is reduced to the predetermined level Vth.

When the switching transistor M1 is turned on, the current $I_{M1}$ flows in the primary coil L1, and thus, energy is accumulated in the transformer T1. Subsequently, when the switching transistor M1 is turned off, the energy accumulated in the transformer T1 is discharged. The on signal generation unit 54 may detect the energy of the transformer T1 being completely discharged, by sensing the voltage $V_{D1}$ that is generated in the auxiliary coil L3. When the on signal generation unit 54 detects the discharge of the energy, the on signal generation unit 54 asserts the on signal Son, for turning on the switching transistor M1.

When the on signal Son is asserted, the driving unit 56 turns on the switching transistor M1, but when the off signal Soff is asserted, the driving unit 56 turns off the switching transistor M1. The driving unit 56 includes a flip flop 58, a pre-driver 60, and a driver 62. The flip flop 58 receives the on signal Son through a set port thereof and receives the off signal Soff through a reset port thereof. The flip flop 58 is shifted in state, according to the on signal Son and the off signal Soff. As a result, a duty ratio of an output signal Smod of the flip flop 58 is modulated in order for the output voltage $V_{OUT}$ to match with the target value $V_{REF}$. In FIG. 3, the high level of the driving signal Smod and the high level of the switching signal OUT correspond to the turn-on of the switching transistor M1, and the low level of the driving signal Smod and the low level of the switching signal OUT correspond to the turn-off of the switching transistor M1.

The pre-driver 60 drives the driver 62 according to the output signal Smod of the flip flop 58. A dead time is set for output signals SH and SL of the pre-driver 60 such that a high side transistor and a low side transistor of the driver 62 are not simultaneously turned on. The switching signal OUT is outputted from the driver 62.

A switch control unit 70 receives the STB signal, and changes the state of the MASK1 port according to the STB signal. Specifically, when the STB signal has a low level, the switch control unit 70 turns off the first switch SW1 by allowing the MASK1 port to have a high impedance. When the STB signal has a high level, the switch control unit 70 turns on the first switch SW1 by allowing the MASK1 port to have a low level. The switch control unit 70 is configured in an open drain type or an open collector type, and an output transistor 76 is prepared in an output port of the switch control unit 70. When the STB signal has a low level, a logic circuit 71 allows a gate signal S1 of the output transistor 76 to have a low level, but when the STB signal has a high level, the logic circuit 71 allows the gate signal S1 to have a high level.

In the above, a configuration of the DC/DC converter 100 is described. An operation of the DC/DC converter 100 will now be described separately in the normal mode and the standby mode.

1. Normal Mode

In the normal mode, the microcomputer 2 allows the STB signal to be negated (low level). At this point, the voltage division ratio of the voltage dividing circuit 26 is set as a first value $K_1$, and thus, feedback is provided in order for the output voltage $V_{OUT}$ to become 12 V.

In the auxiliary converter, in order for the STB signal to be negated, the first switch SW1 is turned off, and the first path 12 becomes effective. As a result, the source voltage $V_{CC1}$ expressed as Equation (1) is supplied to the source port $V_{CC}$ of the control circuit 10. When $V_{OUT}=12$ V and $N_{D2}/N_S=1$, $V_{CC1}=12$ V, and thus, a sufficient source voltage is supplied to the control circuit 10.

2. Standby Mode

In the standby mode, the microcomputer 2 allows the STB signal to be asserted. At this point, the voltage division ratio of the voltage dividing circuit 26 is set as a second value $K_2$, and thus, feedback is provided in order for the output voltage $V_{OUT}$ to become 6 V. A consumption power of the microcomputer 2 is given as the multiplication of the source voltage $V_{OUT}$ and an operation current thereof, and thus, by decreasing the source voltage $V_{OUT}$ of the microcomputer 2, the consumption power can be reduced.

In the auxiliary converter, in order for the STB signal to be negated, the first switch SW1 is turned on, and the second path 14 becomes effective. As a result, the source voltage $V_{CC2}$ expressed as Equation (2) is supplied to the source port $V_{CC}$ of the control circuit 10. When $V_{OUT}=12$ V and $N_D/N_S=2$, $V_{CC2}=12$ V, and thus, even in the standby mode, the source voltage $V_{CC}$ is sufficiently supplied to the control circuit 10 without being reduced. In the standby mode for decreasing the output voltage $V_{OUT}$, the source voltage $V_{CC}$ is not reduced, thus preventing the operation of the control circuit 10 from being destabilized.

Moreover, the amplitude (high-level voltage) of the gate signal of the switching transistor M1 is substantially the same as the source voltage $V_{CC}$. Therefore, as in the circuit of FIG. 1, when the source voltage $V_{CC}$ decreases, since the switching transistor M1 cannot sufficiently be turned on, loss increases, and consequently, the efficiency of the DC/DC converter 100 is deteriorated. To solve such a problem, according to the DC/DC converter 100 of the present embodiment, the source voltage $V_{CC}$ is not reduced, thus preventing the efficiency of the DC/DC converter from being deteriorated.

In the above description, the present disclosure has been described on the basis of the present embodiment. The present embodiment is merely exemplified, and the combination of the elements or processing processes of the present embodiment may be realized as various modification examples. Furthermore, the modification examples can be understood to those skilled in the art. Hereinafter, modification examples will be described.

First Modification Example

The selection circuit 16 may further include a second switch SW2 that is prepared in series with the second diode D2, between the second output capacitor Co2 and the tap TP of the auxiliary coil L3. In this case, the control circuit 10 may additionally have a MASK2 port for controlling the second switch SW2. The switch control unit 70 of FIG. 3 controls the state of the MASK2 port in order for the second switch SW2 to be turned off, according to the STB signal.

Second Modification Example

In the above embodiment, the first switch SW1 has been described as being turned on/off steadily, but the present disclosure is not limited thereto. In the present modification example, the selection circuit 16 includes the first switch SW1 and the second switch SW2. Also, in each mode, a switch in an effective path is switched in synchronization with the switching signal OUT.

That is, in the normal mode, the first switch SW1 is steadily turned off, and the second switch SW2 is switched in synchronization with the switching signal OUT. The control circuit 10, at least, turns off the switching transistor M1, and then turns off the second switch SW2 during a certain period (referred to as a mask period $\Delta T$). The control circuit 10 may turn off the second switch SW2 during the on period Ton of the switching transistor M1, in addition to the mask period $\Delta T$.

The control circuit 10 allows the MASK2 port to have a high impedance (open), in the on period Ton of the switching transistor M1 and the mask period $\Delta T$. Therefore, the second switch SW2 is turned off. In an off period Toff of the switching transistor M1 after the elapse of the mask period $\Delta T$, the control circuit 10 turns on the second switch SW2 by allowing the MASK2 signal to have a low level.

On the contrary, in the standby mode, the second switch SW2 is steadily turned off, and the first switch SW1 is switched in synchronization with the switching signal OUT.

Figure 4:
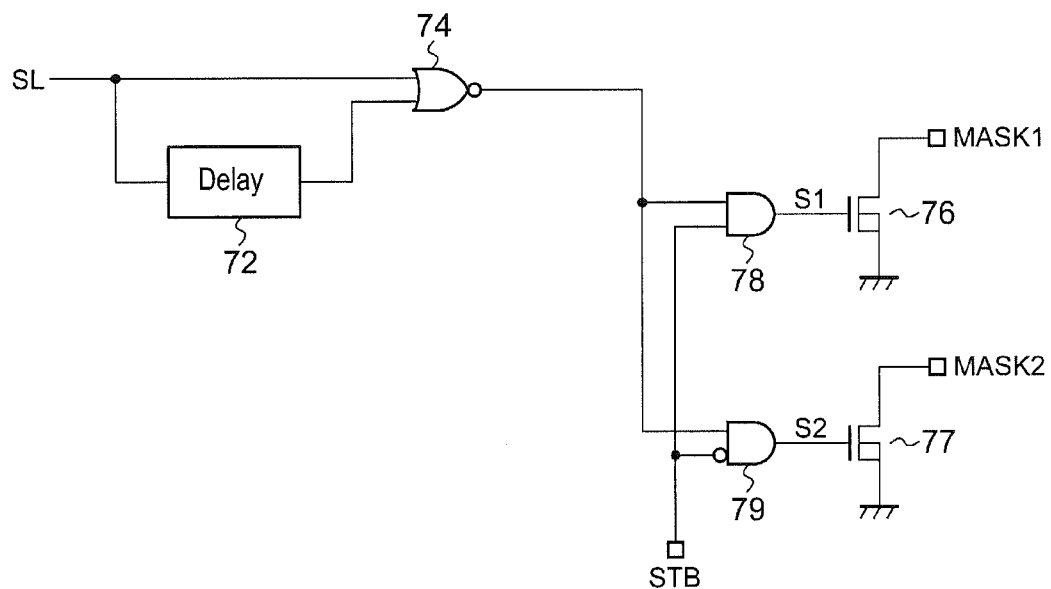
FIG. 4 is a circuit diagram illustrating a configuration of a switch control unit according to a second modification example.

FIG. 4 is a circuit diagram illustrating a configuration of the switch control unit according to the second modification example. The control unit 70a generates mask signals MASK1 and MASK2 that are synchronized with at least one direction of the on signal Son and off signal Soff. Specifically, the switch control unit 70a includes a delay circuit 72, a logic gate 74, AND gates 78 and 79, and output transistors 76 and 77.

The delay circuit 72 delays the low side driving signal SL that has been described above in FIG. 3 during the mask period $\Delta T$. The logic gate (NOR) 74 generates a logical NOR of a non-delayed low side driving signal SL and a delayed low side driving signal SL. During a period where the output of the logic gate 74 has a high level, a switch in an effective path is turned on, but during a period where the output of the logic gate 74 has a low level, the switch is turned off.

The AND gate 78 generates a logical AND S1 of the STB signal and an output of the logic gate 74, and outputs the logical AND S1 to a gate of the output transistor 76. The AND gate 79 generates a logical AND S2 of the STB signal (inversion logic) and the output of the logic gate 74, and outputs the logical AND S2 to a gate of the output transistor 77.

Figure 5:
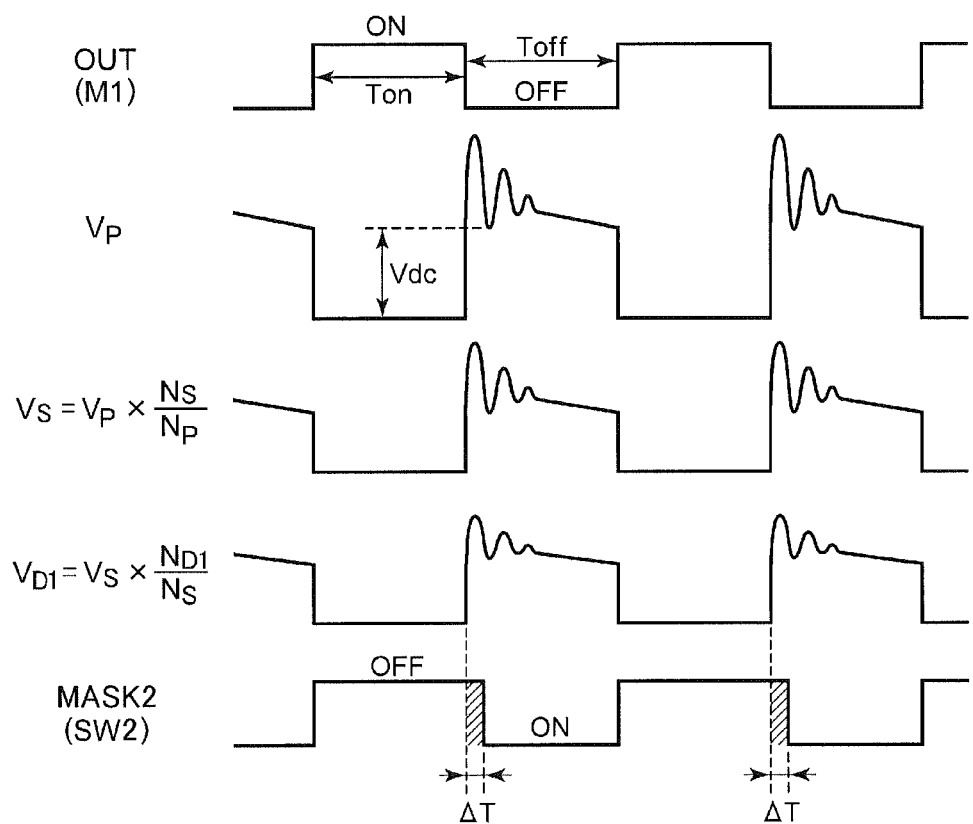
FIG. 5 is a waveform diagram showing an operation of a DC/DC converter according to the second modification example, in a normal mode.

The operation of the second modification example will now be described. FIG. 5 is a waveform diagram showing an operation of a DC/DC converter according to the second modification example, in the normal mode. An ordinate axis and an abscissa axis of FIG. 5 are appropriately enlarged and reduced for easy understanding, and moreover, each shown waveform is simplified for easy understanding. In FIG. 5, the switching signal OUT, an electric potential $V_P$ of one end N1 of the primary coil L1, an electric potential $V_S$ of one end N2 of the secondary coil L2, the electric potential $V_{D1}$ of the tap TP of the auxiliary coil L3, and the mask signal MASK2 are shown in descending order.

First, the main converter is noted. The switching signal OUT is generated by the control circuit 10, and thus, the switching transistor M1 is alternately turned on and off. During the turn-on of the switching transistor M1, the voltage $V_P$ is fixed approximately to a ground voltage.

When the switching transistor M1 is turned off, a counter electromotive force is generated in the primary coil L1, and thus, the voltage $V_P$ greatly increases rapidly. When $V_{DC}=140 V$, a peak voltage may reach about 280 V higher by twice than $V_{DC}$. When the switching transistor M1 is turned off, energy accumulated in the primary coil L1 is transferred as a current to the first output capacitor Co1 through the first diode D1.

The voltage $V_S$ proportional to the voltage $V_P$ of the primary coil L1, namely, having a rapidly increased peak, is generated in one end of the secondary coil L2. The one end of the secondary coil L2 and the first output capacitor Co1 are coupled to each other through the first diode D1. Therefore, if a capacitance value of the first output capacitor Co1 is small, the output voltage $V_{OUT}$ follows the voltage $V_P$ and increases to meet "$V_{OUT}=V_P-Vf$". Herein, Vf is a forward voltage of the first diode D1. However, since the capacitance value of the first output capacitor Co1 is sufficiently large, the output voltage $V_{OUT}$ hardly increases and is constant.

Now the auxiliary converter is noted. Ripple noise equal to that of the voltage $V_P$ occurs even in the voltage $V_{D1}$ of the auxiliary coil L3. The mask signal MASK2, as shown in FIG. 5, is changed to a high level during the mask period $\Delta T$ after the switching transistor M1 is turned off, and thus, the second switch SW2 is turned off. The mask period $\Delta T$ overlaps with a period where ripple noise occurs in the voltage $V_S$.

During the mask period $\Delta T$, since the second switch SW2 is turned off, the ripple noise of the voltage $V_{D1}$ is not applied to the second output capacitor Co2, and thus, even when the capacitance of the second output capacitor Co2 is small, an increase of the second voltage $V_{CC}$ can be prevented.

Advantages of the modification example will now be described below. In a case where the second switch SW2 is not installed, or even in a case where the second switch SW2 is installed, when the second switch SW2 is steadily turned on in the normal mode, the auxiliary coil L3, the second diode D2, and the second output capacitor Co2 are directly connected in the normal mode. At this point, the ripple noise of the voltage $V_P$ appears even in the second voltage $V_{CC}$. This is because the capacitance value of the second output capacitor Co2 is not sufficiently large.

When ripple noise occurs in the second voltage $V_{CC}$, an overvoltage protection (OVP) of the control circuit 10 may be unnecessarily performed, and thus it becomes difficult to design a threshold voltage of the overvoltage protection. Further, since a withstand voltage necessary for the control circuit 10 becomes higher, the cost increases.

To solve such a problem, according to the DC/DC converter 100 of the second modification example, a great increase in the second voltage $V_{CC}$ can be prevented, and thus, it becomes easier to design the control circuit 10, or the cost can be saved.

For the first switch SW1 and the second switch SW2, modification examples will be described below.

For example, the switches SW1 and SW2 may be configured with a transfer gate. Furthermore, the first switch SW1 and the third diode D3 may be exchanged in their disposed positions, and the second switch SW2 and the second diode D2 may be exchanged in their disposed positions.

In the second modification example, the mask period ΔT has been described above as being fixed. However, the length of the mask period ΔT may be dynamically controlled on the basis of at least one of the voltages $V_P$, $V_S$, and $V_{D1}$ that are respectively generated in the primary coil L1, the secondary coil L2, and the auxiliary coil L3.

Moreover, in the on period Ton of the switching transistor M1, a current does not flow from the auxiliary coil L3 to the second output capacitor Co2, and thus, the first switch SW1 and the second switch SW2 may be turned off or on. Those skilled in the art can naturally design various switch control units 70 for generating a necessary mask signal MASK. For example, the switch control unit 70 may generate the necessary mask signal MASK on the basis of any one of the on signal Son, the off signal Soff, the modulation signal Smod, the high side driving signal SH, and the low side driving signal SL, or a combination thereof. Also, a monostable circuit, a counter, or a timer instead of or other than the delay circuit 72 may be used.

Other Modification Examples

Figure 6:
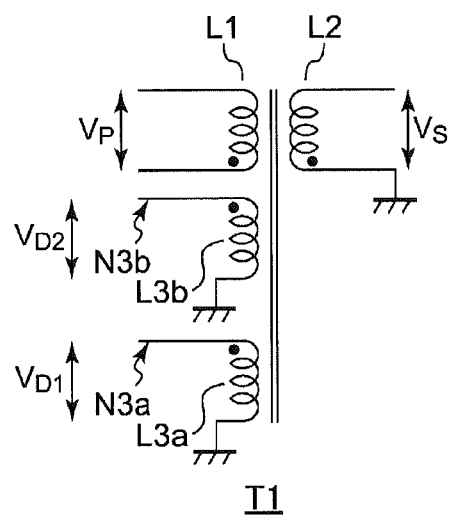
FIG. 6 is a circuit diagram illustrating a configuration of a transformer according to a modification example.

In the above embodiments, the auxiliary coil L3 of the transformer T1 has been described as being configured with a single winding, but the present disclosure is not limited thereto. FIG. 6 is a circuit diagram illustrating a configuration of the transformer T1 according to a modification example.

The auxiliary coil L3 includes two coils L3a and L3b. One end of the coil L3a is a first port N3a, and one end of the coil L3b is a second port N3b. In this configuration, the number of turns of the coil L3a is $N_{D1}$, and the number of turns of the coil L3b is $N_{D2}$. That is, the auxiliary coil L3 may generate a first voltage $V_{D1}$ and a second voltage $V_{D2}$ that are respectively obtained by multiplying the voltage $V_S$ of the secondary coil L2 by different coefficients, or may have other configurations.

In the above embodiments, the output voltage $V_{OUT}$ has been described as being changed by changing the voltage division ratio K, but instead, the reference voltage $V_{REF}$ may be changed.

In the above embodiments, the shunt regulator (error amplifier) 22 has been described as being disposed in the secondary side of the transformer T1. However, the error amplifier may be disposed in the primary side, or built in the control circuit 10.

In the above embodiments, the load (microcomputer) of the secondary side of the transformer T1 has been described as being controlled according to the mode, but the present disclosure is not limited thereto. As another example, a circuit disposed in the primary side may control a mode, in which case a control signal indicating the mode may be transferred from the primary side to the secondary side by a photo coupler.

It can be understood to those skilled in the art that the control circuit 10 may have various types, and moreover, in the present disclosure, the configuration of the control circuit 10 is not limited thereto.

For example, instead of the comparator, a timer circuit for measuring a predetermined off time Toff may be used as the on signal generation unit 54 of FIG. 3. By previously predicting a time taken in discharging energy, the off time Toff may be fixed. In this case, energy efficiency may be deteriorated, but a circuit configuration can be simplified.

In the above embodiments, the DC/DC converter 100 has been described as being mounted on the electronic device 1, but the present disclosure is not limited thereto. The DC/DC converter 100 may be applied to various power supplies. For example, the DC/DC converter 100 may be applied even to an AC adaptor that supplies power to an electronic device. In this case, a laptop computer, a desktop computer, a portable phone terminal, a CD player, etc. are exemplified as the electronic device, but the present disclosure is not particularly limited thereto.

According to the embodiments of the present disclosure, the insulating DC/DC converter is capable of operation even when the output voltage is decreased.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A DC/DC converter, comprising:
a transformer comprising a primary coil, a secondary coil, and an auxiliary coil which is disposed in a primary coil side, the auxiliary coil comprising: a first port configured to generate a first voltage which is obtained by multiplying a voltage generated in the secondary coil and a first coefficient; and a second port configured to generate a second voltage which is obtained by multiplying the voltage generated in the secondary coil and a second coefficient greater than the first coefficient;
a first output capacitor including a first end and a second end, the first end of the first output capacitor having a fixed electric potential and the second end being connected to an output port of the DC/DC converter;
a first diode disposed in a direction where a cathode of the first diode faces toward the first output capacitor, between the second end of the first output capacitor and one end of the secondary coil;
a switching transistor disposed on a path of the primary coil;
a second output capacitor including a first end and a second end, the first end of the second output capacitor having a fixed electric potential;
a second rectification element disposed in a direction where a cathode of the second rectification element faces the second output capacitor, between the second end of the second output capacitor and the first port of the auxiliary coil;
a third rectification element disposed in a direction where a cathode of the third rectification element faces toward the second output capacitor, between the second end of the second output capacitor and the second port of the auxiliary coil;

a selection circuit configured to select a first path comprising the second rectification element in a first mode where an output voltage of the output port has a first level, and select a second path comprising the third rectification element in a second mode where the output voltage has a second level lower than the first level; and a control circuit configured to receive a voltage which is generated in the second output capacitor through a power supply port and control turn-on or turn-off of the switching transistor.

2. The DC/DC converter of claim 1, wherein the auxiliary coil comprises one coil having a tap which is arranged in the middle of a winding thereof, the tap being the first port, and one end of the auxiliary coil being the second port.

3. The DC/DC converter of claim 1, wherein the auxiliary coil comprises two coils, one end of a coil of one side being the first port, and one end of a coil of the other side being the second port.

4. The DC/DC converter of claim 1, wherein,
the DC/DC converter is switched between the first mode and the second mode according to a control signal generated based on a load of the DC/DC converter,
the DC/DC converter further comprises a photo coupler configured to transfer the control signal from a secondary side of the transformer to a primary side of the transformer, and
the selection circuit is controlled on the basis of the control signal.

5. The DC/DC converter of claim 1, further comprising:
an error amplifier configured to generate an error signal based on an error between the output voltage and a predetermined reference voltage; and
a photo coupler configured to receive the error signal from the error amplifier, and transfer a feedback signal based on the error signal from the secondary side of the transformer to the primary side of the transformer,
wherein the control circuit controls turn-on or turn-off of the switching transistor on the basis of the feedback signal.

6. The DC/DC converter of claim 5, further comprising a voltage dividing circuit configured to divide the output voltage at a changeable voltage division ratio, and output the divided voltage to the error amplifier, wherein the voltage division ratio of the voltage dividing circuit is changed according to whether the DC/DC converter is in the first mode or the second mode.

7. The DC/DC converter of claim 6, wherein,
the voltage division ratio of the voltage dividing circuit is changed according to a control signal generated based on a load of the DC/DC converter,
the DC/DC converter further comprises a photo coupler configured to transfer the control signal from a secondary side of the transformer to a primary side of the transformer, and
the selection circuit is controlled on the basis of the control signal.

8. The DC/DC converter of claim 1, wherein the selection circuit comprises a first switch disposed in series with the third rectification element, between the second end of the second output capacitor and the second port of the auxiliary coil.

9. The DC/DC converter of claim 8, wherein the selection circuit further comprises a second switch disposed in series with the second rectification element, between the second end of the second output capacitor and the first port of the auxiliary coil.

10. The DC/DC converter of claim 8, wherein the first switch comprises a PNP type bipolar transistor, a collector of the PNP type bipolar transistor being connected to the second output capacitor.

11. A power supply, comprising:
an AC/DC converter configured to convert a commercial AC voltage into a DC voltage; and
the DC converter of claim 1 configured to receive the DC voltage, and drop the DC voltage to supply the dropped voltage to a load.

12. An electronic device, comprising:
a microcomputer; and
the DC converter of claim 1 configured to supply an output voltage thereof to the microcomputer,
wherein,
in a normal state of the electronic device, the DC/DC converter generates an output voltage having a first level, and
in a standby state of the electronic device, the DC/DC converter generates an output voltage having a second level lower than the first level.

* * * * *